United States Patent
Haydock et al.

(10) Patent No.: US 6,919,711 B2
(45) Date of Patent: Jul. 19, 2005

(54) ELECTRICAL MACHINE AND AN ELECTRICAL POWER GENERATING SYSTEM

(75) Inventors: Lawrence Haydock, Peterborough (GB); Wlodzimierz Koczara, Warsaw (PL); Nazar Al-Khayat, Rutland (GB)

(73) Assignee: Newage International Limited, Stamford (GB)

( * ) Notice: Subject to any disclaimer, the term of this patent is extended or adjusted under 35 U.S.C. 154(b) by 0 days.

(21) Appl. No.: 10/489,873

(22) PCT Filed: Sep. 19, 2002

(86) PCT No.: PCT/GB02/04249
§ 371 (c)(1),
(2), (4) Date: Aug. 5, 2004

(87) PCT Pub. No.: WO03/026125
PCT Pub. Date: Mar. 27, 2003

(65) Prior Publication Data
US 2004/0251881 A1 Dec. 16, 2004

(30) Foreign Application Priority Data

Sep. 19, 2001 (GB) .............................................. 0122618
Sep. 20, 2001 (GB) .............................................. 0122721

(51) Int. Cl.[7] .............................................. H02P 9/00
(52) U.S. Cl. .............................. 322/24; 322/25; 322/20; 322/22; 322/46; 322/29; 363/95; 363/363; 363/50
(58) Field of Search .............................. 322/24, 28, 25, 322/22, 20, 46, 19; 323/29; 363/95, 50

(56) References Cited

U.S. PATENT DOCUMENTS

| | | |
|---|---|---|
| 5,373,195 A | 12/1994 | De Doncker et al. |
| 6,262,896 B1 | 7/2001 | Stancu et al. |
| 6,281,595 B1 | 8/2001 | Sinha et al. |
| 6,573,689 B1 * | 6/2003 | Renehan ...................... 322/24 |
| 6,707,275 B2 * | 3/2004 | Okahara et al. .............. 322/24 |
| 6,737,833 B2 * | 5/2004 | Kalman et al. ............... 322/20 |
| 6,750,634 B2 * | 6/2004 | Taniguchi et al. ............ 322/28 |
| 6,750,635 B2 * | 6/2004 | Harmon ....................... 322/29 |
| 6,795,378 B2 * | 9/2004 | Shimizu et al. ............. 368/204 |
| 6,812,675 B2 * | 11/2004 | Okamoto et al. ............. 322/28 |

FOREIGN PATENT DOCUMENTS

| | | |
|---|---|---|
| EP | 0 566 320 A2 | 10/1993 |
| EP | 0 947 042 B1 | 10/1999 |
| WO | WO 01/58002 A2 | 8/2001 |

* cited by examiner

Primary Examiner—Nicholas Ponomarenko
Assistant Examiner—Iraj A. Mohandesi
(74) Attorney, Agent, or Firm—Woodard, Emhardt, Moriarty, McNett & Henry LLP (57) ABSTRACT

A generating set includes an engie driven generator (PGM) having two sets of stator windings (Ga and Gb). A bi-directional AC/DC converter (BCo) has its AC input connected to a junction between the two sets of stator windings (Ga and Gb) and its DC input connected to a number of the generator (PGM) is converted into an intermediate DC link by a convertor (Col) to produce an output for a load Lo. In normal operation of the system, an emf generated in one (Ga) of the sets of stator windings is rectified by the bi-direcitonal converter (BCo) to charge the energy storages (ESI–ESN) whilst the remainder of the generator output is fed through the converter to the load (Lo). In the event of a stepped increase in the load demand, the bi-directional converter (BCo) is operated to feed energy from the storage devices (ESI–ESN) to the stator windings (Ga) of the generator (PGM) to impart a driving torque to the generator rotor to accelerte the rotor to meet the increased load demand. The energy stored in the storages devices (ESI–ESN) could be used to start the engine (EN).

15 Claims, 5 Drawing Sheets

ELECTRICAL MACHINE AND AN ELECTRICAL POWER GENERATING SYSTEM

This invention relates to an electrical machine and to an electrical power generating system including such a machine.

An electrical power generating system of the kind to which this invention relates includes generator means operable to generate a variable voltage generator output, a variable speed prime mover drivingly coupled with the generator means, speed control means operable to control the speed of the prime mover, converter means operable to establish an intermediate DC link by converting the variable voltage generator output into an intermediate DC voltage and to convert the intermediate DC voltage to an electrical power output for supply to an external load, sensing means operable to monitor the intermediate DC link when the load is connected across the intermediate DC voltage and to provide a feedback signal to the speed control means whereby to effect variation of the variable voltage electrical output and thereby to counter a tendency of the intermediate DC voltage to vary.

The prime mover may be an internal combustion engine or an external combustion power plant such as a turbine. Usually such prime movers require the application of external power for starting. Internal combustion engines are usually provided with a special starter motor to which power is supplied from a battery. That battery is charged by a special separate generator which is driven by the engine in order to ensure that the battery stores enough energy for a number of starts. A high speed gas turbine is usually provided with a directly coupled generator which is adapted to operate as a motor to start the turbine and as a generator after the turbine has been started.

When the load demand on an electrical power generating system of the kind referred to is low and the prime mover is an internal combustion engine, that engine is operated at a low speed. It must be accelerated to a higher speed to cope with any increase in the power demand. If the load demand should increase by a considerable amount, a certain amount of time must be allowed for the engine to speed up and restore its ability to produce the power demanded. The total time between the increase in the load and the instant when the power generated by the engine matches that demanded by the load, consists of the time required for the engine speed control system to react, the time required for the fuel rate to be increased to the required level, the time required for the engine output torque to be increased to the required level and the time required for the engine to accelerate to the required high speed. The latter time for acceleration is proportional to the inertia factor and is inversely proportional to the difference between the torque produced by the engine on the one hand and the torque load produced by the generator on the other hand.

In order to optimise the use of the engine and the ability of the engine to produce power, the system is arranged so that the torque of the generator is as high as possible, that is to say almost as high as that of the engine. It follows that a consequence of optimising the use of the engine is an increase in the time required for that engine to accelerate. Moreover, whilst the engine is accelerating to the required level, the power produced by that engine is below the demanded level and that results in a drop in the output power of the system that is fed to load.

When the prime mover is a turbine, a sudden increase in the external load results in a decrease in the turbine speed. The turbine driving torque is dependent on the second power of speed (T=speed$^2$). As the turbine driving torque is reduced for low speed, the time required to recover turbine speed in response to an increase in the external load is long and the induced voltage is below the demanded level during the acceleration.

WO98/28832 discloses a generating set which comprises an engine/generator which provides a variable voltage electrical output, this output being rectified and fed to a DC to DC converter, the output DC voltage of the DC to DC converter being monitored by a control circuit and serving as an intermediate DC output which is fed to an inverter to generate an AC output which supplies an external load. The DC to DC converter decouples or isolates the intermediate DC output from fluctuations in the current and/or voltage output of the generator so that the apparatus is able to accommodate substantial variations in the output of the generator while maintaining the intermediate output within desired operating parameters. The DC to DC converter also serves to de-couple or isolate the generator from variations in the load. An energy storage device, for example a capacitor, is connected in parallel with the DC link and thereby provides a short term energy reserve when the load applied to the DC link voltage varies suddenly. This energy storage device may be supplemented by other similar devices with respective control systems. In some cases, such supplementary energy storage devices may be excluded. Instead, a load anticipation circuit may be introduced to cope with high impact or step loads.

WO 01/56133 discloses an AC generating system including generator means operable to generate a variable voltage AC power supply, rectifier means having an output and operable to rectify the variable voltage AC power supply, booster means having an input which is connected to the output of the rectifier means and which is operable to increase the voltage of the rectified output of the rectifier means thereby to provide an intermediate DC voltage, inverter means operable to convert the intermediate DC voltage into an AC power output for supply to an external load, voltage sensing and control means operable to monitor the intermediate DC voltage and to provide a feedback control signal to the generator means whereby to vary the variable voltage AC power supply so as to counter a tendency of the intermediate DC voltage to vary and electrical energy storage means connected across the intermediate DC voltage so as to be charged by the intermediate DC voltage, wherein bistable switching means and associated control means are provided, the bistable switching means normally being in one state in which they are operable to make the connection of the electrical energy storage means across the intermediate DC voltage to enable the electrical energy storage means to be charged and to interrupt a connection between the electrical energy storage means and the connection between the output of the rectifier means and the input of the booster means, the bistable switching means being operable in its other state to isolate the electrical energy storage means from the intermediate DC voltage and to make the connection of the electrical energy storage means with the connection between the output of the rectifier means and the input of the booster means whereby to enable discharge of electrical energy from the electrical energy storage means into the connection between the rectifier means and the booster means, the control means associated with the bistable switching means being responsive to the monitored intermediate DC voltage and being operable in response to a fall in the intermediate DC voltage to a certain reference level to switch the bistable means from its normal said one state to said other state whereby to discharge electrical energy to augment the rectified output of the rectifier means and thereby to counter the sensed fall in the intermediate DC voltage.

It follows that, from WO 98/28832 and WO 01/56133 it is known to provide battery energy storage from which energy is drawn and injected into the DC part of an electrical power generating system of the kind referred to, whereby to temporarily raise the output voltage of the system to the required level whilst the engine is accelerated to increase its power and the generator torque to raise the output voltage of the system to the required level and allow the battery energy to be disconnected.

WO 01/58002 discloses an electrical power generating system which includes an engine driven generator and which has two modes of operation. The generator has two sets of three-phase stator windings. In one mode of operation of the system, the three phase output of one of the sets of three phase stator windings is rectified to produce an intermediate DC voltage which is applied to an output of an invertor by which it is converted into an AC output which is suitable for powering lights, appliances and power tools. In another, alternative mode of operation, the three phase output of the other set of three phase stator windings is converted into a DC output for charging a battery or jump starting a vehicle. A feedback signal derived from the current provided by the first mentioned of the two sets of three phase stator windings and which thereby is indicative of engine speed is used to control the throttle setting and thereby to affect engine speed during the respective mode of operation of the system. During the other mode of operation, engine speed is limited by controlling ignition in accordance with the DC output for charging the battery or jump starting the vehicle.

U.S. Pat. No. 5,373,195 discloses an electric vehicle drive system including a bidirectional DC-DC converter which is connected between the propulsion battery apparatus and an invertor, the invertor having its AC output connected to drive the vehicle motor. During regenerative braking, electric power from the high voltage DC link between the bidirectional DC-DC converter and the invertor is converted to the battery voltage value resulting in current flow into the battery.

Another possible approach to the problem of a sudden increase in the external load is to place a limit on the amount of increase in load demand that can be tolerated by the system.

An object of this invention is to provide an AC electrical machine which is adapted to cater with the problems that are discussed above in a novel and improved manner.

According to one aspect of this invention there is provided an AC electrical machine including a rotor, a stator and windings on the stator in which an emf is induced by rotation of the rotor, wherein there are further windings on the stator which are connected through bi-directional AC/DC conversion means to a chargeable source of electrical potential, and control means operable to effect operation of the bi-directional AC/DC conversion means in a selected one of two modes, the bi-directional AC/DC conversion means being operable in one of the two modes to rectify an electrical potential generated by induction of an emf in the further windings and to conduct the rectified electrical potential to charge the chargeable source and in the other mode to invert the electrical potential of the chargeable source into an AC potential and to apply that AC potential to the further windings whereby to produce a rotating magnetic field around the rotor and thereby to apply a driving torque to the rotor.

A preferred application of an AC electrical machine in which this invention is embodied is as the generator means of an electrical power generating system of the kind referred to.

In the event of there being a stepped increase in the external load applied across the intermediate DC voltage, the invention operates to provide a larger acceleration of the rotating system with minimal delay, the rotating system being the engine driven shaft and the rotor of the generator that are coupled together. The larger acceleration results in a reduction in the time required for the prime mover to build power. The increase in acceleration is achieved by injection of power into the electrical machine which is working partly as a generator and partly as a motor. Therefore the electrical machine acts as a torque producer and then as an acceleration unit as does the engine.

An alternative application of an electrical machine in which this invention is embodied is as a chargeable source of electrical energy for an internal combustion engine starter motor thus eliminating the need for a separate battery and a separate special generator driven by the engine for charging that battery.

Two embodiments of this invention will now be described by way of example with reference to the accompanying drawings of which.

Figure 1:
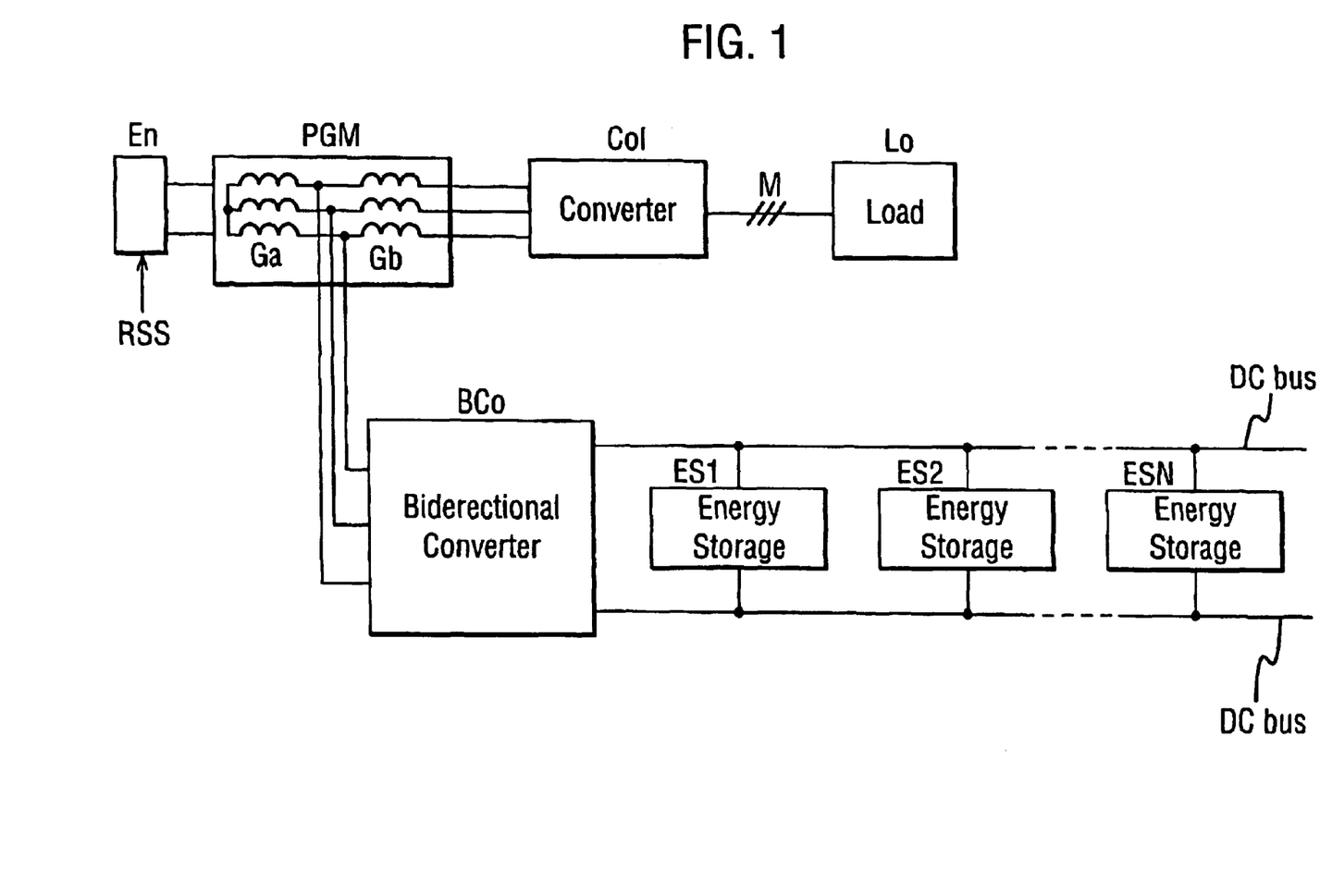
FIG. 1 is a block diagram of one form of generating set in which this invention is embodied.

FIG. 1 shows a prime mover En which is controlled by a reference signal RSS. The reference signal RSS may be derived from any suitable source for any suitable reason. A permanent magnet generator PGM has a rotor which is drivingly coupled with the prime mover En for rotation relative to a stator. The rotor carries N poles permanent magnets, where N is the number of pole pairs. The N permanent magnets are arranged in at least one circular array. The stator has a stator winding arrangement which is split into two sets Ga and Gb which are connected in series. The two winding sets Ga and Gb may be parts of a single winding with a tapping at their junction. Alternatively they may be separate winding sets connected together in series at their junction. The exemplary stator winding arrangement shown in FIG. 1 is a three phase winding arrangement. Rotation of the rotor relative to the stator winding sets Ga and Gb induces an emf in each of the stator winding sets Ga and Gb. The sum of the emfs induced in the stator winding sets Ga and Gb is an output generator voltage which is fed to a converter Col which produces an M phase voltage (for example a three phase voltage) which is supplied to a load Lo. A bi-directional converter BCo has an AC output and a DC output. The AC output is connected to the junction between the winding sets Ga and Gb. N sets of energy storage devices ES1, ES2 . . . ESN are connected in parallel across the DC output of the bi-directional converter BCo. Every one of the energy storage devices ES1, ES2, . . . ESN is equipped with its own converter which assures by-directional power flow between its energy storage and the bi-directional converter BCo.

The bi-directional converter BCo and the part of the generator PGM that includes the rotor and the winding set Ga functions as a brushless permanent magnet machine which can operate as a generator or as a motor. The bi-directional converter BCo either rectifies the AC voltage at the junction between the winding sets Ga and Gb and feeds the rectified output to charge the energy storage devices ES1 . . . ESN or inverts the voltage stored in the energy storage devices ES1 . . . ESN to produce an AC voltage which is applied to the winding set Ga to energise it as a motor winding dependent upon whether the load demand is or is not met by the output from the generator PGM.

In a steady state when the engine En is not fully loaded, the winding set Ga works as a generator winding and the bi-directional converter BCo operates as a rectifier supplying the energy storage devices ES1, ES2 . . . ESN through a DC bus. However, when the engine En has to accelerate to meet an increase in demand due to a stepped increase in the load Lo, the part of the generator PGM that includes the winding set Ga and that is controlled by the bi-directional converter BCo, operates as a motor which results in a reduction in the time needed for the rotor to be accelerated to the speed required to raise the output of the converter CoI to the level demanded by the load, whereas the converter CoI continues to produce an output voltage due to linking of the magnetic field of the permanent magnets carried by the rotor with the winding sets Ga and Gb of the stator winding arrangement. As the voltage produced by inducing an emf in the stator winding set Ga is lower than the total voltage produced by inducing emf in both the winding sets Ga and Gb, the rated voltage of the bi-directional converter BCo and of the energy storage devices ES1 and ES2 . . . ESN may be lower than it would need to be were the output generator voltage of the generator PGM to be fed to the bi-directional converter BCo.

An application of the system shown in FIG. 1 that includes the bi-directional converter BCo and the energy storage devices ES1, ES2 . . . ESN that are charged by applying the voltage generated by inducing an emf in the winding set Ga across the energy storage device ES1, ES2 . . . ESN is for starting the engine EN. A conventional starter would not be needed. This is because, as the winding set Ga supplies a voltage to charge the energy storage devices ES1, ES2 . . . ESN through the bi-directional converter BCo, a conventional alternator is not needed for charging a starter battery. There are two different functions, charging and starting that have to be separately described.

Figure 2:
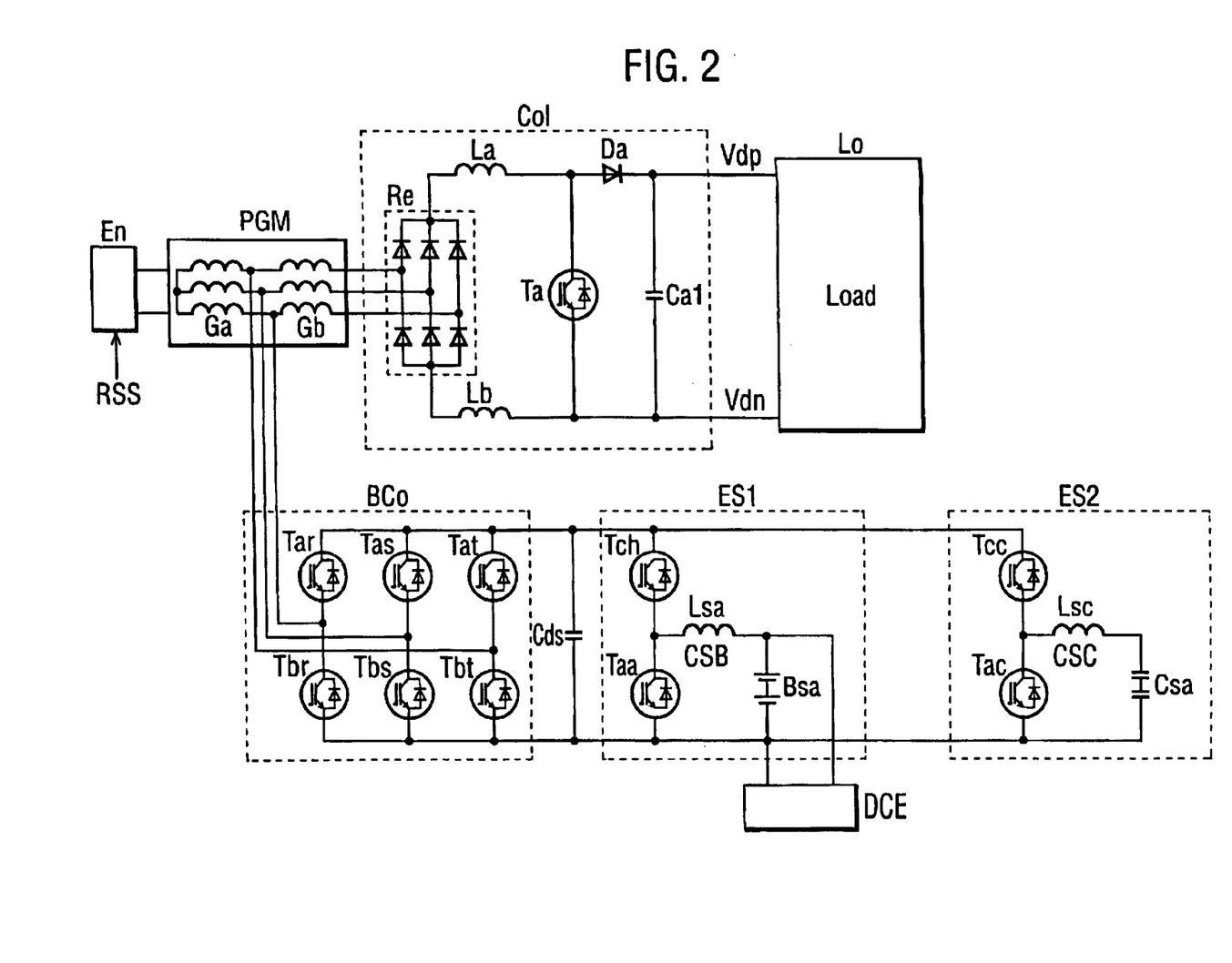
FIG. 2 is a circuit diagram of the generating set shown in FIG. 1.

FIG. 2 shows suitable circuits for use as the converter CoI, the bi-directional converter BCo and two energy storage devices ES1 and ES2.

The converter CoI has a full wave bridge rectifier Re which is operable to rectify the three phase variable frequency and voltage output of the generator PGM and which has two output terminals. One side of an inductor LA is connected to the positive output terminal of the bridge rectifier Re. The other side of the inductor La is connected to the collector of a transistor Ta and to the anode of a diode Da. One side of another inductor Lb is connected to the negative output terminal of the bridge rectifier Re. The cathode of the diode Da is connected to one side of a capacitor Cal and to the positive output terminal Vdp of the converter CoI. The other side of the inductor Lb is connected to the emitter of the transistor Ta, to the other side of the capacitor Cal and to the negative output terminal Vdn of the converter CoI. The converter CoI operates as a booster which stabilises the output voltage across the capacitor Cal. Provision would be made in a preferred embodiment of the invention to monitor the voltage across the capacitor Cal. A pulse width modulated drive would be fed to the base of the transistor Ta from a suitable source, such as a current controller which is responsive to the voltage across the capacitor Cal and current flow through the transistor Ta as is described in WO 01/56133 whereby the transistor Ta would source a controlled current to maintain the voltage across the capacitor Cal constant.

The bi-directional converter BCo is a three phase transistor converter. A capacitor Cds is connected across the DC output terminals of the bi-directional converter BCo as are each of the energy storage devices ES1, ES2 . . . ESN. The capacitor CDS is used as a DC voltage filter.

The energy storage device ES1 includes a charging transistor Tch which has its collector connected to the positive output terminal of the bi-directional converter BCo and a discharging transistor Taa which has its emitter connected to the negative output terminal of the bi-directional converter BCo. The emitter of the charging transistor Tch is connected to the collector of the discharging transistor Taa. The positive terminal of a battery storage system Bsa is connected through an inductor Lsa to the junction between the emitter of the charging transistor Tch and the collector of the discharging transistor Taa. A power source DCE for the control units of the variable speed generating system such as is described in WO 01/56133 is connected across the battery supply system Bsa and has its negative terminal connected to the negative DC output of the bi-directional converter BCo as well as to the negative terminal of the battery storage system Bsa.

The energy storage device ES2 similarly includes a charging transistor Tcc and a discharging transistor Tac, the collector of the former being connected to the positive DC output terminal of the bi-directional converter BCo and the emitter of the latter being connected to the negative DC output terminal of the bi-directional converter BCo, the emitter of the charging transistor Tcc being connected to the collector of discharging transistor Tac. A bank Csa of capacitors has a positive terminal connected to the junction between the collector of the discharging transistor Tca and the emitter of the charging transistor Tcc through an inductor Lsc. A negative terminal of the bank Csa of capacitors is connected to the negative DC output terminal of the bi-directional converter BCo.

Once the engine En has been started and steady state running conditions have been established, the voltage across the capacitor Cal is monitored by a suitable control system (not shown) and, as long as that voltage continues to be maintained at a substantially constant level, the voltage generated by operation of the generator PGM in excess of that required to maintain the voltage across the capacitor Cal substantially constant, is fed to the bi-directional converter BCo. The latter is controlled by the control system to operate as a rectifier to convert the voltage it receives from the winding set Ga into a DC voltage which is maintained across the capacitor Cds. The control system would provide a suitable pulse width modulated drive to the base of each of the charging transistors Tch and Tcc and to each of the discharging transistors Taa and Tac. The charging transistors Tch and Tcc would be switched on by the respective pulse width modulated drive signals whilst the discharging transistors Taa and Tac and would be switched off by the respective pulse width modulated drive signals. Accordingly the DC voltage maintained across the capacitor Cds is applied through the charging transistor Tch to charge the battery storage system Bsa and the power source DCE. Further the bank Csa of capacitors are charged through the charging transistor Tcc.

In the event of a stepped increase in the load Lo that is applied across the capacitor Ca1 of the converter Co1, the consequent drop in the voltage across the capacitor Ca1 will result in the total voltage generated in the two winding sets Ga and Gb being fed to the converter Co1. Also the controls of the transistors of the bi-directional converter BCo and of the energy storage devices ES1 and ES2 will be changed. Accordingly the bidirectional converter BCo will be set to operate as an inverter, the charging transistors Tch and Tcc will be switched off and the discharging transistors Taa and Tac will be switched by the respective pulse width modulated drive signals. The energy storage devices ES1 and ES2, such as in the battery system Bsa and the bank Csa of capacitors, will discharge through diodes of the charging transistors Tch and Tcc, due to the action of the respective discharging transistors Taa and Tac, to the DC output of the bi-directional converter BCo in which that discharged energy is converted to an AC current. That AC current is emitted from the AC output of the bi-directional converter BCo and fed into the generator PGM in which it is applied to the winding Ga which then operates as a motor winding whereby the rotor of the generator PGM is accelerated rapidly and the output voltage from the generator PGM is increased so that the voltage across the capacitor Ca1 is raised to the level demanded by the load Lo.

The battery system Bsa is a source of energy for starting the engine and for engine acceleration.

The energy storage device ES2 with its bank Csa of capacitors is used to increase the total power for a short term to cater for transient load variations and for the engine starting.

High frequency switching of the bi-directional transistor converter BCo results in prompt and precise control of the permanent magnet motor torque. The common DC bus voltage of the converter BCo, the energy storage device ES1 and the energy storage device ES2 is maintained to provide a DC voltage across the capacitor Cds as required for the motor operation in the full range of the generator operation.

Figure 3:
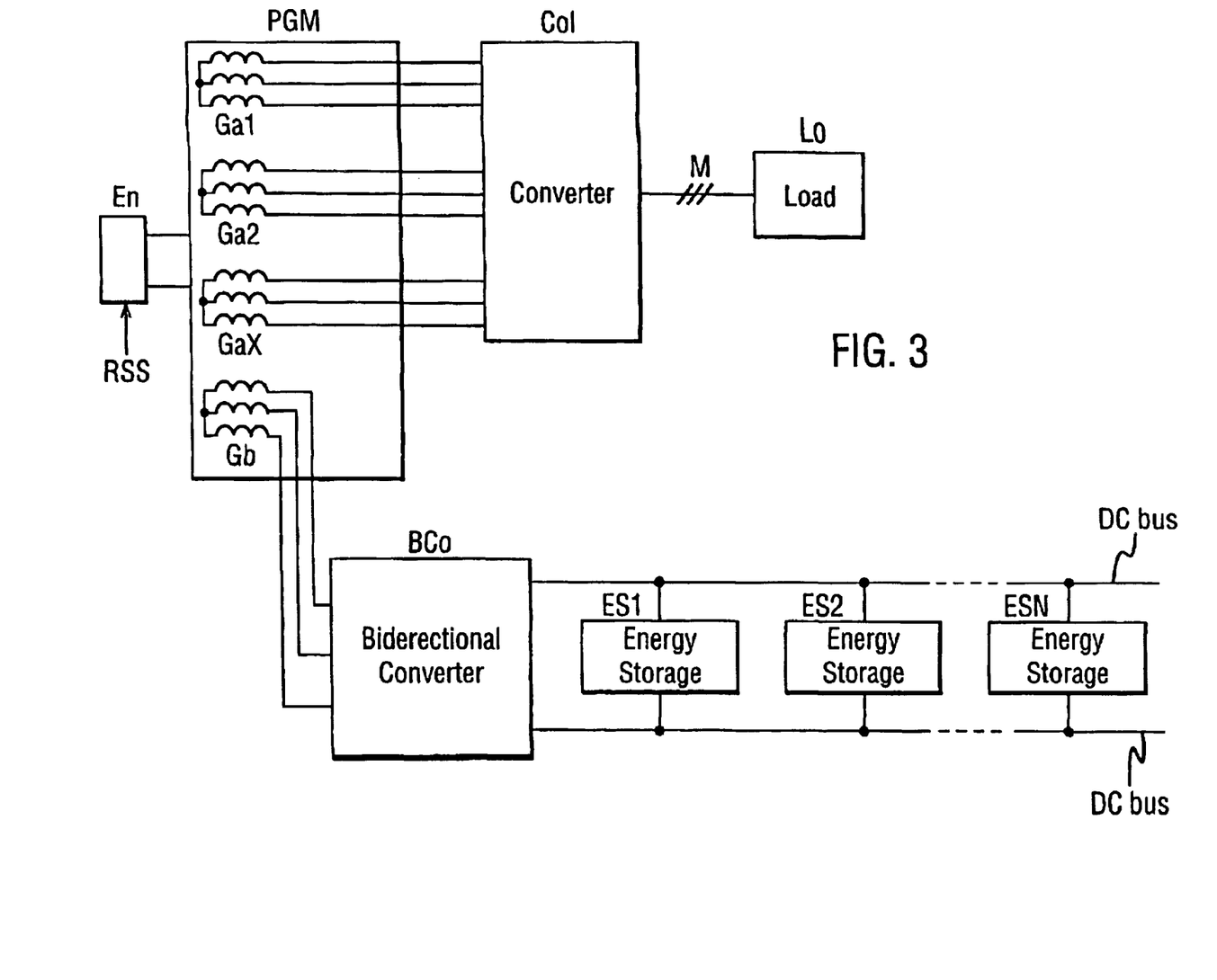
FIG. 3 is a block diagram of another form of generating set in which this invention is embodied.

FIG. 3 shows that in another embodiment of the invention, the generator PGM has X sets of stator windings Ga1, Ga2, . . . GaX which are connected to supply the converter Co1 which is operable to produce the standard M phase AC voltage output which is fed to the load Lo. The generator PGM has an additional winding Gb which is connected to a series connected group of energy storage devices ES1, ES2, . . . ESN through the bi-directional converter BCo. The additional winding Gb in combination with the bi-directional converter BCo and the energy storage devices ES1, ES2 . . . ESN may be operated as a generator or as a motor. When operating as a motor, it either operates as a starter for the engine En or it supports the engine En. Alternatively, the generator winding Gb in combination with the bi-directional converter BCo and the energy storage devices ES1, ES2 . . . ESN operates as a generator when the engine is not fully loaded.

Figure 4:
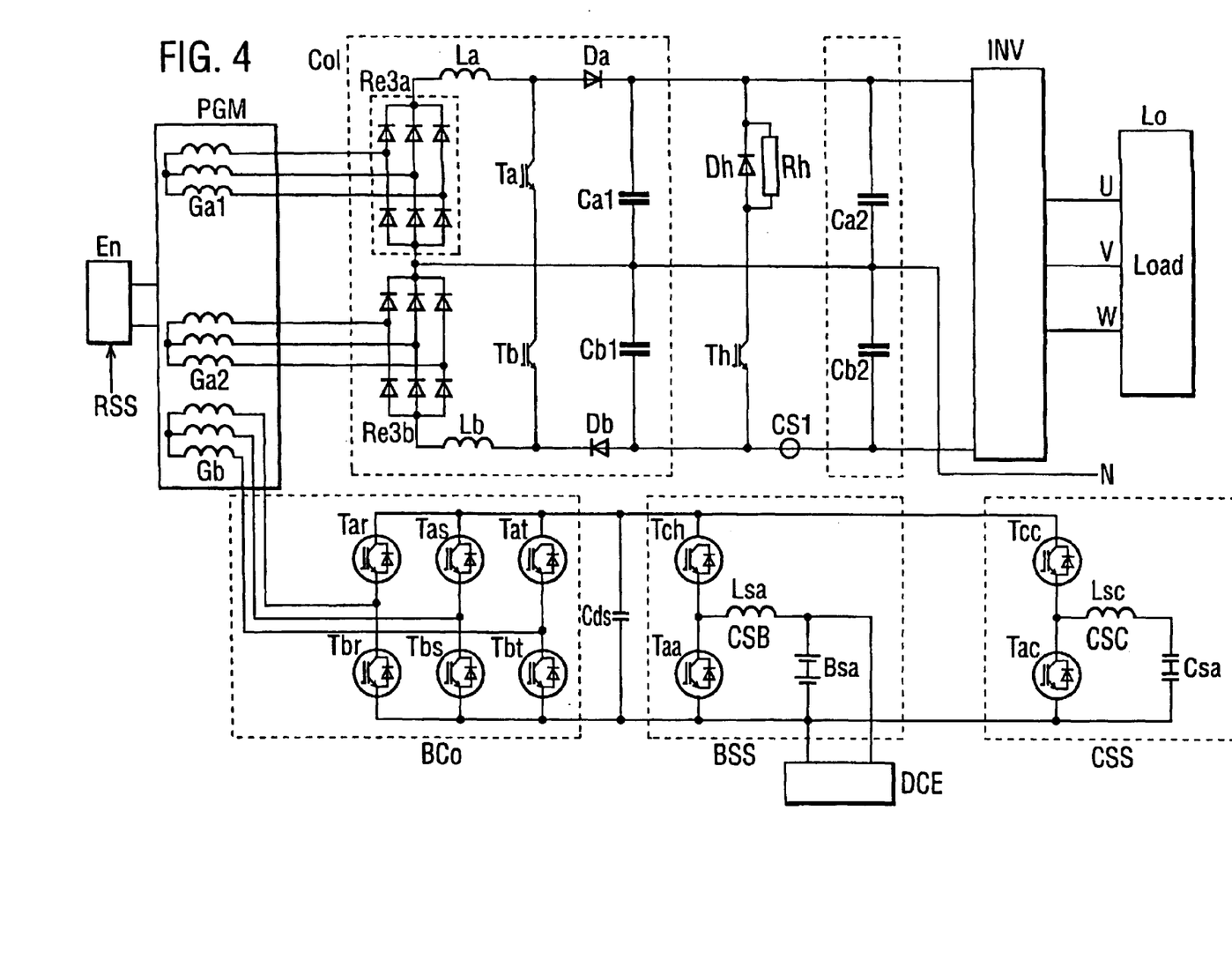
FIG. 4 is a circuit diagram of the generating set shown in FIG. 3.

FIG. 4 shows the converter Co1 for the generating set shown in FIG. 3. Operation of the additional winding Gb together with the bi-directional converter BCo and the switching devices BSS and CSS etc is as has been described above with reference to FIGS. 1 and 2. The arrangement of the converter Co1 is similar to that that has been described with reference to and as illustrated in FIGS. 7A and 7B of WO 01/56133. The additional winding Gb is arranged so that the voltage induced therein is usually lower than the voltage induced in the windings Ga1, GA2 . . . GaX which simplifies the design of the supporting system.

Figure 5:
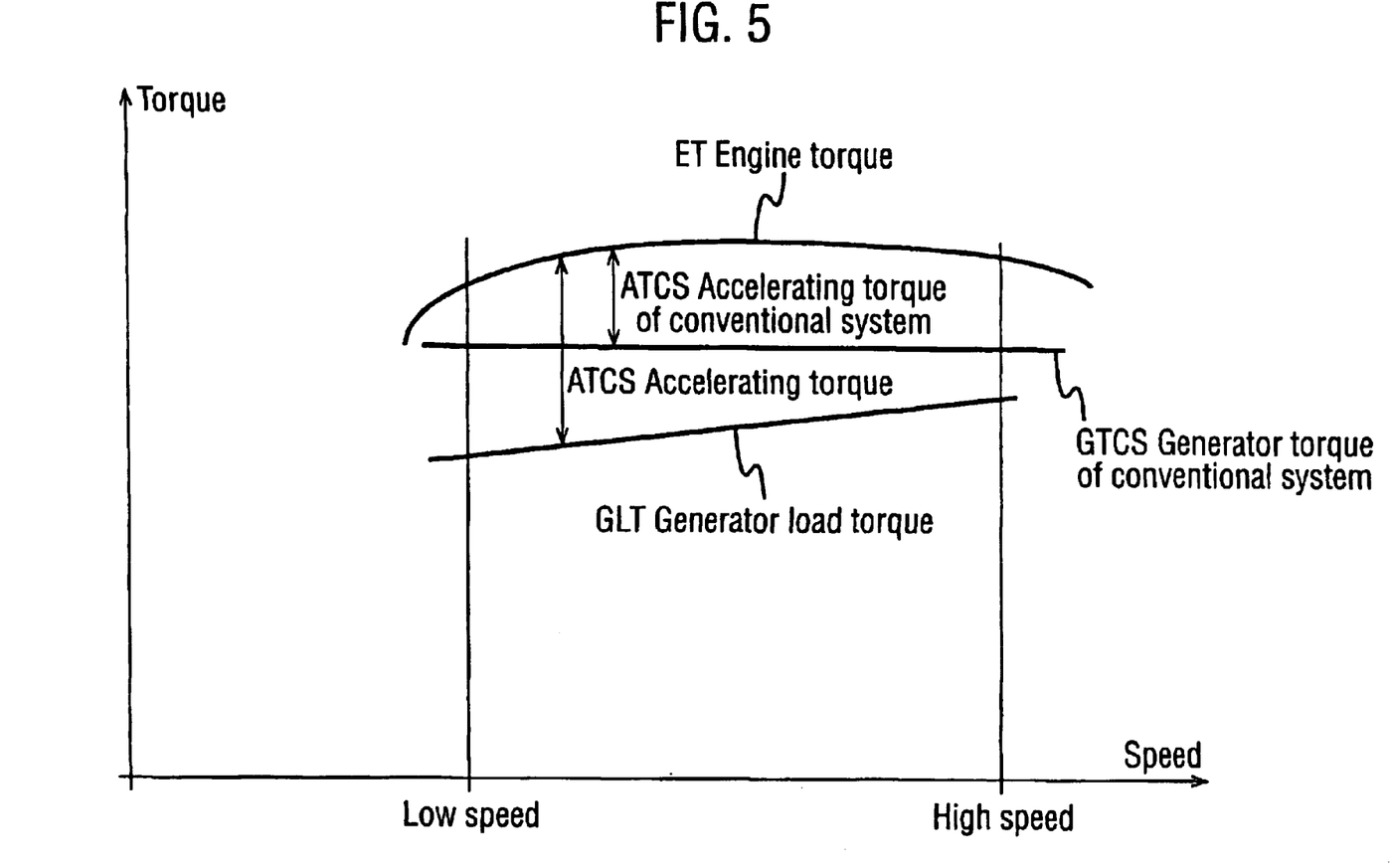
FIG. 5 is a graphical illustration of the concept of the invention.

FIG. 5 is a graph of torque against speed of the engine and illustrates the concept of the invention as applied to an exemplary generator.

The curve ET is an ideal curve of engine maximum torque against speed and which the engine manufacturer would advise be followed for optimum efficiency of operation of the engine. When in operation of the embodiment described above with reference to and as shown in FIG. 4, the transistors Ta and Tb of the convertor CO1 are operated to control generator current to provide a constant maximum generator current and to maintain the intermediate DC load voltage (that is the voltage across the capacitor Ca1) substantially constant, the generator torque follows the straight line GTCS. This would allow some torque to be available for accelerating the engine to facilitate maintaining the intermediate DC load voltage substantially constant, that accelerating torque being the difference between the curves ET and GTCS. However that acceleration would not be sufficient to prevent a significant transient reduction in the power supply to the load. On the other hand, the curve GLT represents the generator load torque of a generator PGM which embodies the additional winding sets as are provided by this invention. The consequence of applying a voltage to the winding set Ga in the embodiment described above with reference to and as shown in FIG. 2 or to the winding set Gb in the embodiment described above with reference to and as shown in FIG. 4, is operation of that winding set as a motor winding and reduction of torque produced by the generator PGM from that illustrated by the curve GTCS to that illustrated by the curve GLT and thereby to provide a greater amount of accelerating torque.

Therefore, in the event of a stepped increase in the load, the resulting drop of the supply voltage is reduced and occurs for a shorter time period.

What is claimed is:

1. An AC electrical machine including a rotor, a stator and two sets of windings on the stator in which an emf is induced by rotation of the rotor, one of the two sets of windings on the stator being connected to a chargeable source of electrical potential, said AC electrical machine further including control means operable to effect operation of the AC electrical machine in one of two modes, the AC electrical machine being operable in one of the two modes to rectify an electrical potential generated by induction of an emf in said one set of windings and to conduct the rectified electrical potential to charge the chargeable source, wherein said one set of windings is connected to said chargeable source of electrical potential through bi-directional AC/DC conversion means and said control means are operable to effect operation of said bi-directional AC/DC conversion means in a respective one of two modes for each of said two modes of operation of the AC electrical machine, the bi-directional AC/DC conversion means being operable in said one mode of operation of the AC electrical machine to effect said rectification of the electrical potential to charge the chargeable source, and in the other mode to invert the electrical potential of the chargeable source into an AC potential and to apply that AC potential to said one set of windings whereby to produce a rotating magnetic field around the rotor and thereby to apply a driving torque to the rotor, to accelerate the rotor in response to an increase in load demand on the AC electrical machine, the emf induced in the other set of windings being available to meet a load demand on the AC electrical machine during both modes of operation of the AC electrical machine and during said other mode of operation of the AC electrical machine, to do so in combination with the emf induced in said one set of windings.

2. An AC electrical machine according to claim 1, wherein said chargeable source of electrical potential is one of a plurality of such chargeable sources of electrical potential which each include an energy storage and which are each equipped with respective conversion means which are operable to assure bi-directional transmission of electrical potential between the respective energy storage and a DC output of the bi-directional AC/DC conversion means.

3. An AC electrical machine according to claim 2, wherein each said conversion means includes a charging transistor and a discharging transistor and said control means are operable to activate the charging transistors and to deactivate the discharging transistors for said one mode and to activate said discharging transistors and to deactivate said charging transistors for said other mode.

4. An AC electrical machine according to claim 1, wherein the bi-directional AC/DC conversion means is a 3-phase transistor converter.

5. An AC electrical machine according to claim 1, wherein said one set of windings are connected in series with said other set of windings on the stator and an AC output of said bi-directional AC/DC conversion means is connected to a junction between said one set of windings and said other set of windings.

6. An electrical power generating system of the kind which includes generator means operable to generate a variable voltage generator output, a variable speed prime mover drivingly coupled with the generator means, speed control means operable to control the speed of the prime mover, converter means operable to establish an intermediate DC link by converting the variable voltage generator output into an intermediate DC voltage and to convert the intermediate DC voltage to an electrical power output for supply to an external load, sensing means operable to monitor the intermediate DC link when the load is connected across the intermediate DC voltage and to provide a feedback signal to the speed control means whereby to effect variation of the variable voltage electrical output and thereby to counter a tendency of the intermediate DC voltage to vary wherein the generator means is an AC electrical machine including a rotor, a stator and two sets of windings on the stator in which an emf is induced by rotation of the rotor, one of the two sets of windings on the stator being connected to a chargeable source of electrical potential and control means operable to effect operation of the AC electrical machine in one of two modes are provided, the AC electrical machine being operable in one of the two modes to rectify an electrical potential generated by induction of an emf in said one set of windings and to conduct the rectified electrical potential to charge the chargeable source, said one set of windings being connected to said chargeable source of electrical potential through bi-directional AC/DC conversion means and said control means being operable to effect operation of said bi-directional AC/DC conversion means in a respective one of two modes for each of said two modes of operation of the AC electrical machine, the bi-directional AC/DC conversion means being operable in said one mode of operation of the AC electrical machine to effect said rectification of the electrical potential to charge the chargeable source, and in the other mode to invert the electrical potential of the chargeable source into an AC potential and to apply that AC potential to said one set of windings whereby to produce a rotating magnetic field around the rotor and thereby to apply a driving torque to the rotor, to accelerate the rotor in response to an increase in load demand on the AC electrical machine, the emf induced in the other set of windings being available to meet a load demand on the AC electrical machine during both modes of operation of the AC electrical machine and during said other mode of operation of the AC electrical machine, to do so in combination with the emf induced in said one set of windings.

7. An electrical power generating system according to claim 6 in which said chargeable source of electrical potential is one of a plurality of such chargeable sources of electrical potential which each include an energy storage and which are each equipped with respective conversion means which are operable to assure bi-directional transmission of electrical potential between the respective energy storage and a DC output of the bi-directional AC/DC conversion means, wherein an energy storage device of one of the chargeable sources of electrical potential includes one or more batteries which are a source of energy for starting the prime mover.

8. An electrical power generating system according to claim 7 wherein the energy storage device of at least one of the chargeable sources of electrical potential includes at least one capacitor and said control means are operable to effect discharge thereof in said other mode to cater for one of transient variations in the external load demand and starting said prime mover.

9. An electrical power generating system according to claim 6, in which said chargeable source of electrical potential is one of a plurality of such chargeable sources of electrical potential which each include an energy storage and which are each equipped with respective conversion means which are operable to assure bi-directional transmission of electrical potential between the respective energy storage and a DC output of the bi-directional AC/DC conversion means and each said conversion means includes a charging transistor and a discharging transistor and said control means are operable to activate the charging transistors and to deactivate the discharging transistors for said one mode and to activate said discharging transistors and to deactivate said charging transistors for said other mode, wherein an energy storage device of one of the chargeable sources of electrical potential includes one or more batteries which are a source of energy for starting the prime mover.

10. An electrical power generating system according to claim 6 in which said chargeable source of electrical potential is one of a plurality of such chargeable sources of electrical potential which each include an energy storage and which are each equipped with respective conversion means which are operable to assure bi-directional transmission of electrical potential between the respective energy storage and a DC output of the bi-directional AC/DC conversion means, wherein an energy storage device of one of the chargeable sources of electrical potential includes a source of power for energizing control units of the generating system.

11. An electrical power generating system according to claim 10 wherein the energy storage device of at least one of the plurality of chargeable sources of electrical potential includes at least one capacitor and said control means are operable to effect discharge thereof in said other mode to cater for one of transient variations in the external load demand and starting said prime mover.

12. An electrical power generating system according to claim 6, in which said chargeable source of electrical potential is one of a plurality of such chargeable sources of electrical potential which each include an energy storage and which are each equipped with respective conversion means which are operable to assure bi-directional transmission of electrical potential between the respective energy storage and a DC output of the bi-directional AC/DC conversion means and each said conversion means includes a charging transistor and a discharging transistor and said control means are operable to activate the charging transistors and to deactivate the discharging transistors for said one mode and to activate said discharging transistors and to deactivate said charging transistors for said other mode, wherein an energy storage device of one of the chargeable sources of electrical potential includes a source of power for energizing control units of the generating system.

13. An electrical power generating system according to claim 6 in which said chargeable source of electrical potential is one of a plurality of such chargeable sources of electrical potential which each include an energy storage and which are each equipped with respective conversion means which are operable to assure bi-directional transmission of electrical potential between the respective energy storage and a DC output of the bi-directional AC/DC conversion means, wherein an energy storage device of at least one of the chargeable sources of electrical potential includes at least one capacitor and said control means are operable to effect discharge thereof in said other mode to cater for one of transient variations in the external load demand and starting said prime mover.

14. An electrical power generating system according to claim 6, in which said chargeable source of electrical potential is one of a plurality of such chargeable sources of electrical potential which each include an energy storage and which are each equipped with respective conversion means which are operable to assure bi-directional transmission of electrical potential between the respective energy storage and a DC output of the bi-directional AC/DC conversion means and each said conversion means includes a charging transistor and a discharging transistor and said control means are operable to activate the charging transistors and to deactivate the discharging transistors for said one mode and to activate said discharging transistors and to deactivate said charging transistors for said other mode, wherein an energy storage device of at least one of the chargeable sources of electrical potential includes at least one capacitor and said control means are operable to effect discharge thereof in said other mode to cater for one of transient variations in the external load demand and starting said prime mover.

15. An electrical power generating system according to claim 6 in which said one set of windings are connected in series with said other set of windings on the stator and an AC output of said bi-directional AC/DC conversion means is connected to a junction between said one set of windings and said other set of windings, wherein said control means is operable to disenable said bi-directional AC/DC conversion means whilst the intermediate DC voltage is being increased to a certain level after starting.

\* \* \* \* \*